US012620004B2

(12) United States Patent
Liu et al.

(10) Patent No.: US 12,620,004 B2
(45) Date of Patent: *May 5, 2026

(54) REAL-TIME DAYPARTING MANAGEMENT

(71) Applicant: Walmart Apollo, LLC, Bentonville, AR (US)

(72) Inventors: Changzheng Liu, Sunnyvale, CA (US); Boning Zhang, Santa Clara, CA (US); Changfu Li, San Diego, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 225 days.

This patent is subject to a terminal disclaimer.

(21) Appl. No.: 18/232,731

(22) Filed: Aug. 10, 2023

(65) Prior Publication Data

US 2023/0385878 A1 Nov. 30, 2023

Related U.S. Application Data

(63) Continuation of application No. 17/587,054, filed on Jan. 28, 2022, now Pat. No. 11,748,779.

(51) Int. Cl.
| | |
|---|---|
| *G06Q 30/0251* | (2023.01) |
| *G06N 5/01* | (2023.01) |
| *G06Q 30/0273* | (2023.01) |

(52) U.S. Cl.
CPC ........... *G06Q 30/0264* (2013.01); *G06N 5/01* (2023.01); *G06Q 30/0255* (2013.01); *G06Q 30/0275* (2013.01)

(58) Field of Classification Search
CPC ........... G06Q 30/0264; G06Q 30/0255; G06Q 30/0275; G06N 5/01

(Continued)

(56) References Cited

U.S. PATENT DOCUMENTS

| | | | |
|---|---|---|---|
| 11,080,764 B2 | 8/2021 | Dong et al. | |
| 2007/0162379 A1* | 7/2007 | Skinner .............. | G06Q 30/0277 |
| | | | 705/37 |

(Continued)

FOREIGN PATENT DOCUMENTS

| | | |
|---|---|---|
| CN | 112488755 | 3/2021 |
| CN | 106960359 | 9/2021 |

OTHER PUBLICATIONS

Donghun Lee et al., Optimal Online Learning in Bidding for Sponsored Search Auctions, IEEE, 2017 (Year: 2017).*

(Continued)

*Primary Examiner* — Tarek Elchanti
(74) *Attorney, Agent, or Firm* — DICKINSON WRIGHT RLLP; Hector A. Agdeppa

(57) ABSTRACT

A method including obtaining real-time observed orders per minute (OPM) data. The method also can include training a prediction model to make a real-time OPM prediction for a current time period, based on the real-time observed OPM data over past time steps based on lagged time steps in a moving average. The method additionally can include determining, in real-time, whether a demand surge exists based on the real-time observed OPM data and the real-time OPM prediction, to generate a first surge modifier. The method further can include when the demand surge exists, generating, in real-time, a sub-hour revenue per click (RPC) prediction for a first sub-hour time interval. The method additionally can include determining, in real-time, the first surge modifier for the first sub-hour time interval. The method further can include uploading, in real-time, the first surge modifier to a dayparting system of a search engine to bypass existing time intervals and modifiers. Other embodiments are described.

14 Claims, 12 Drawing Sheets

(58) Field of Classification Search
USPC .............. 705/14.61, 14.66, 37, 14.54, 14.42;
706/46
See application file for complete search history.

(56) References Cited

U.S. PATENT DOCUMENTS

| | | | |
|---|---|---|---|
| 2008/0249832 A1* | 10/2008 | Richardson ........ | G06Q 30/0256 705/14.54 |
| 2010/0198679 A1* | 8/2010 | Kassakian .............. | G06Q 30/02 705/14.42 |
| 2013/0185161 A1* | 7/2013 | Letca ................. | G06Q 30/0261 705/14.66 |
| 2015/0127595 A1* | 5/2015 | Hawkins, II ............. | G06N 7/01 706/46 |
| 2016/0371316 A1* | 12/2016 | Okanohara .............. | G06N 7/01 |
| 2017/0126795 A1* | 5/2017 | Kumar ................ | H04L 67/1008 |
| 2017/0278130 A1* | 9/2017 | Ao .......................... | H04W 4/23 |
| 2018/0268444 A1* | 9/2018 | Dong ....................... | G06N 7/01 |
| 2019/0303403 A1* | 10/2019 | More ................. | H04N 21/4402 |
| 2020/0134696 A1* | 4/2020 | Lardeux ............. | G06Q 30/0254 |
| 2021/0150582 A1 | 5/2021 | Wang et al. | |
| 2022/0129926 A1* | 4/2022 | Bryant .............. | G06Q 30/0218 |

OTHER PUBLICATIONS

Adam Hayes, Autoregressive Integrated Moving Average (ARIMA) Prediction Model, 2022 (Year: 2022) 2022.
Donghun Lee et al., Optimal Online Learning in Bidding for Sponsored Search Auctions, IEEE, 2017 (Year: 2017) 2017.

* cited by examiner

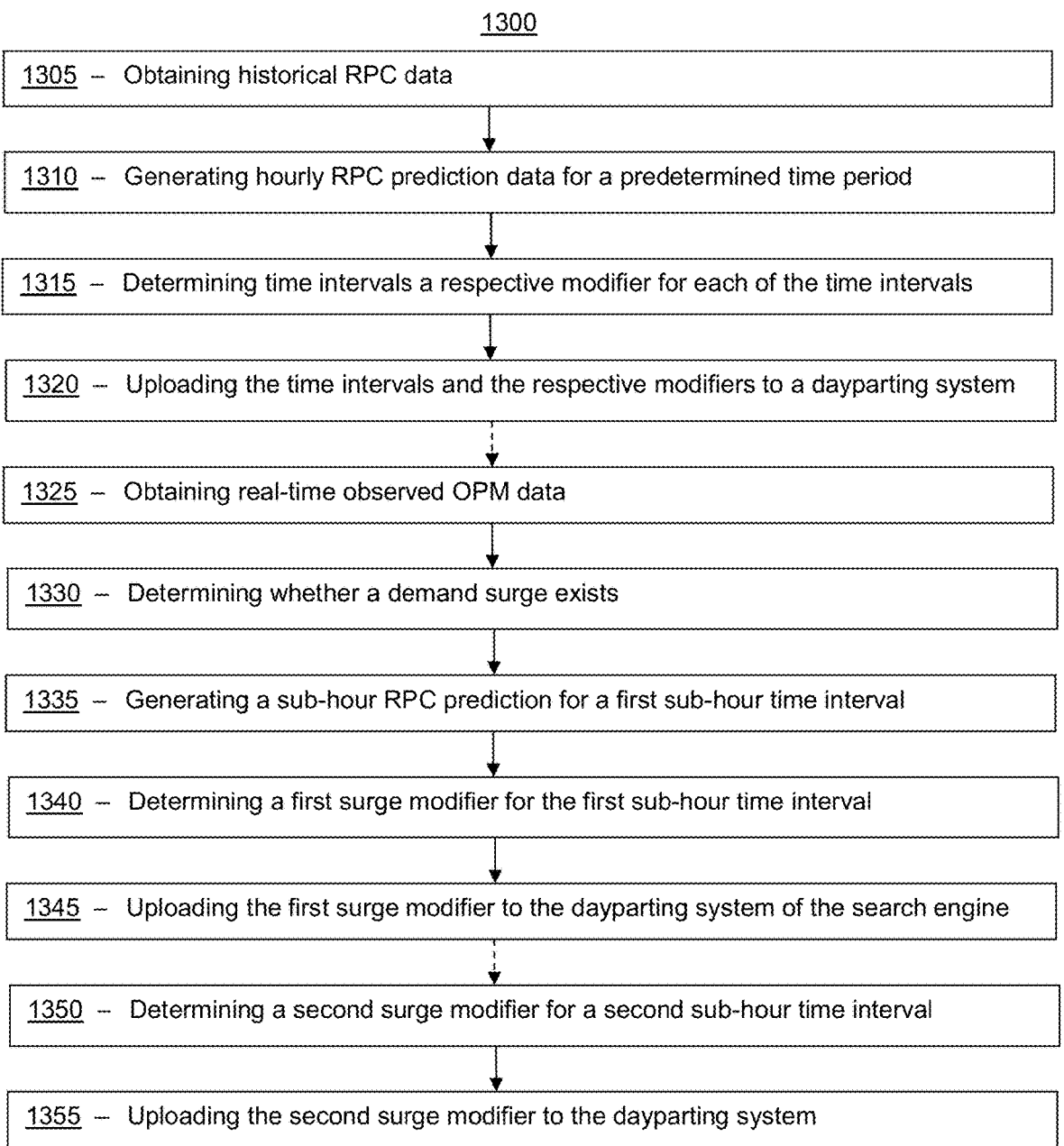

1300

1305 – Obtaining historical RPC data

1310 – Generating hourly RPC prediction data for a predetermined time period

1315 – Determining time intervals a respective modifier for each of the time intervals 1320 – Uploading the time intervals and the respective modifiers to a dayparting system 1325 – Obtaining real-time observed OPM data 1330 – Determining whether a demand surge exists 1335 – Generating a sub-hour RPC prediction for a first sub-hour time interval 1340 – Determining a first surge modifier for the first sub-hour time interval 1345 – Uploading the first surge modifier to the dayparting system of the search engine 1350 – Determining a second surge modifier for a second sub-hour time interval 1355 – Uploading the second surge modifier to the dayparting system

1405 — Comparing whether the real-time observed OPM data for a current time period exceeds OPM prediction data for the current time period 1410 — Determining whether the real-time observed OPM data is a statistical outlier 1415 — Calculating a P value for the real-time observed OPM data 1420 — Determining whether the P value is less than a predetermined threshold

REAL-TIME DAYPARTING MANAGEMENT

CROSS-REFERENCE TO RELATED APPLICATIONS

This application is a continuation of U.S. patent application Ser. No. 17/587,054, filed Jan. 28, 2022. U.S. patent application Ser. No. 17/587,054 is incorporated herein by reference in its entirety.

TECHNICAL FIELD

This disclosure relates generally to real-time dayparting management.

BACKGROUND

Search engine marketing (SEM) is a form of Internet marketing that involves promotion of websites by increasing their visibility in search engine results pages (SERPs), primarily through paid advertising, often through bidding for advertisements (ads). Some search engines, such as Google and Bing, offer SEM dayparting. Dayparting is a way to split a day into multiple intervals (e.g., six different time intervals per day) and use a respective modifier of a base bid for search engine marketing (SEM) advertisement bids during each of those time intervals. Those who use dayparting generally set the time intervals and modifiers through manual operations and/or do not adjust in real-time to changing behavior of users of the search engines.

BRIEF DESCRIPTION OF THE DRAWINGS

To facilitate further description of the embodiments, the following drawings are provided in which:

FIG. 13 illustrates a flow chart for a method of providing real-time dayparting management, according to an embodiment.

Figure 1:
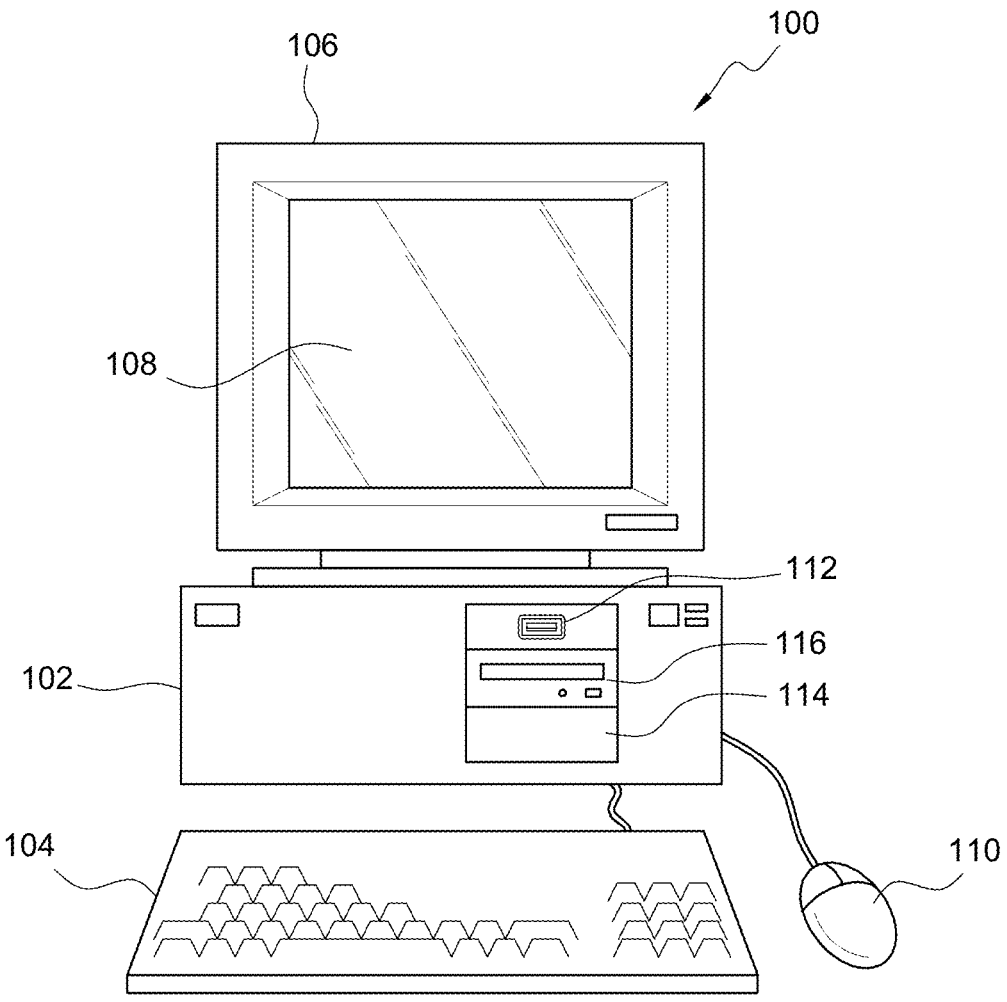
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, three seconds, five seconds, or ten seconds.

DESCRIPTION OF EXAMPLES OF EMBODIMENTS

Figure 2:
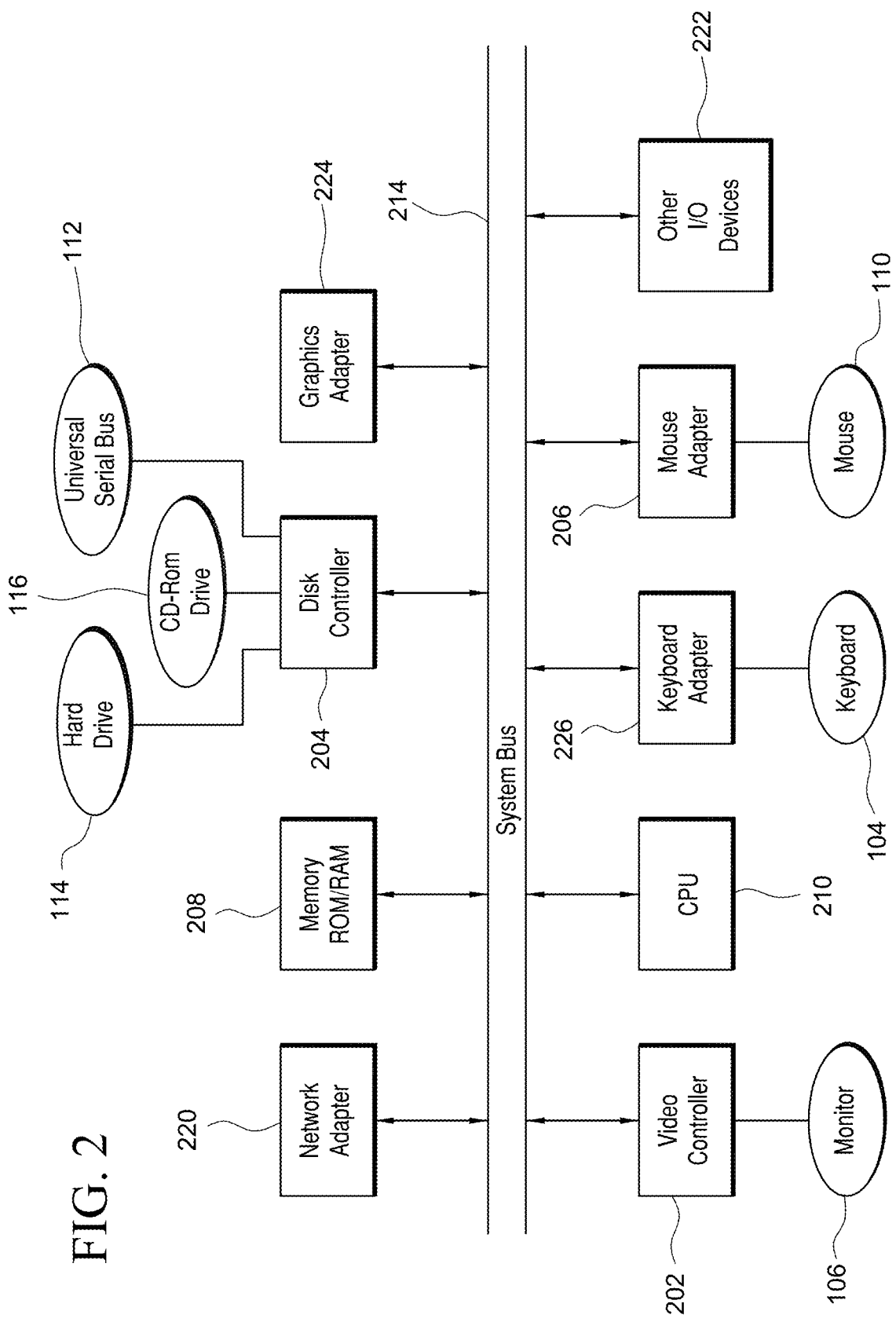
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
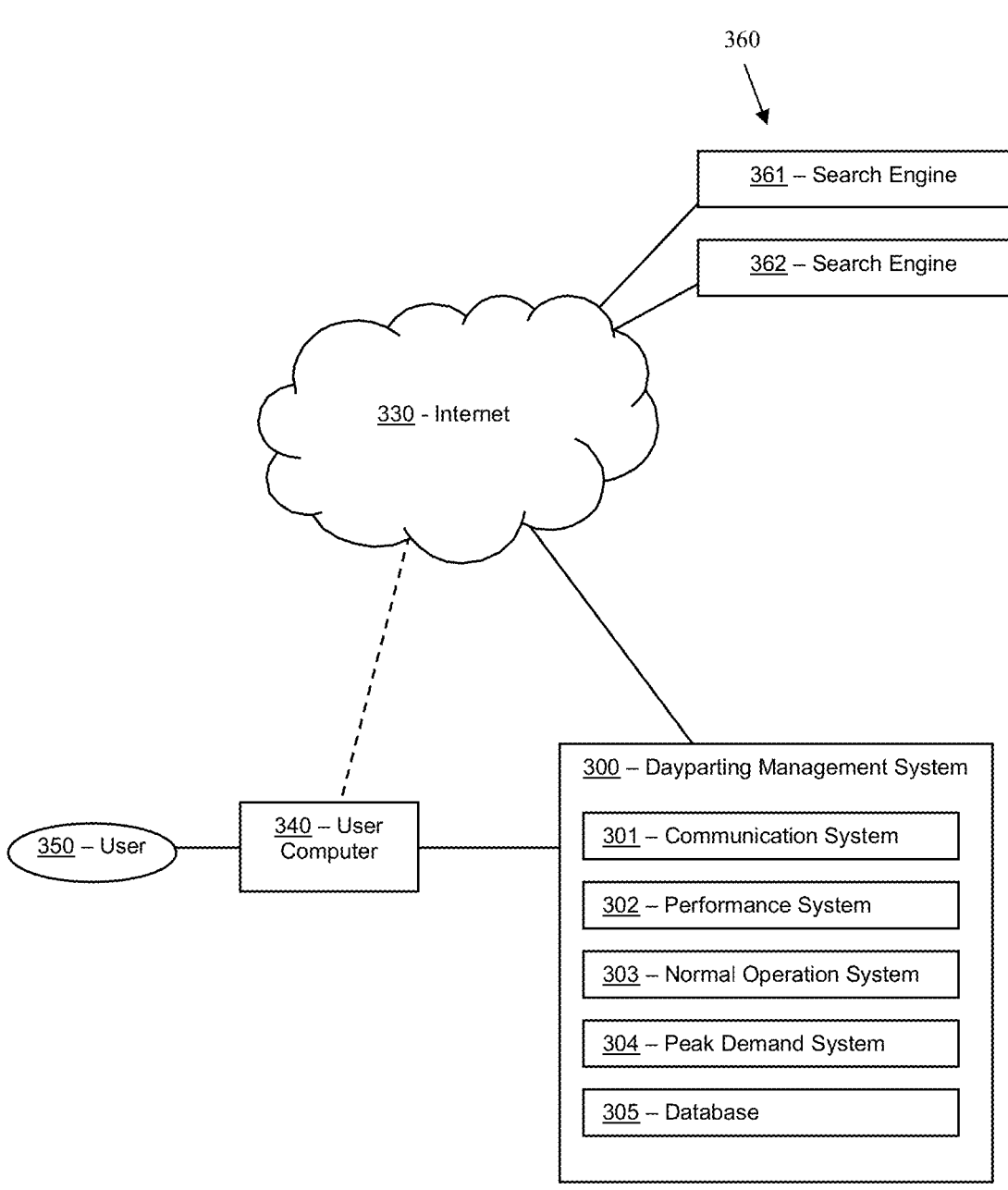
FIG. 3 illustrates a block diagram of a dayparting management system that can be employed for providing real-time dayparting management, according to an embodiment.

Turning ahead in the drawings, FIG. 3 illustrates a block diagram of a dayparting management system 300 that can be employed for providing real-time dayparting management, according to an embodiment. Dayparting management system 300 is merely exemplary, and embodiments of the system are not limited to the embodiments presented herein. The system can be employed in many different embodiments or examples not specifically depicted or described herein. In some embodiments, certain elements, modules, or systems of dayparting management system 300 can perform various procedures, processes, and/or activities. In other embodiments, the procedures, processes, and/or activities can be performed by other suitable elements, modules, or systems of dayparting management system 300. Dayparting management system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of dayparting management system 300 described herein.

In many embodiments, dayparting management system 300 can include a communication system 301, a performance system 302, a normal operation system 303, a peak demand system 304, and/or a database 305. In many embodiments, the systems of dayparting management system 300 can be modules of computing instructions (e.g., software modules) stored at non-transitory computer readable media that operate on one or more processors. In other embodiments, the systems of dayparting management system 300 can be implemented in hardware. Dayparting management system 300 can be a computer system, such as computer system 100 (FIG. 1), as described above, and can be a single computer, a single server, or a cluster or collection of computers or servers, or a cloud of computers or servers. In another embodiment, a single computer system can host dayparting management system 300. Additional details regarding dayparting management system 300 and the components thereof are described herein.

In some embodiments, dayparting management system 300 can be in data communication directly or through a network 330, such as the Internet, with one or more user computers, such as user computer 340. In some embodiments, user computer 340 can be used by users, such as user 350. In many embodiments, dayparting management system 300 can host a website, an application, or another form of graphical user interface. For example, dayparting management system 300 can host a website that allows users to manage bidding for SEM and/or to configure dayparting management. In many embodiments, an internal network that is not open to the public can be used for communications between dayparting management system 300 and user computer 340. In other embodiments, user computer 340 can access dayparting management system 300 through network 330.

In certain embodiments, user computers (e.g., 340) can be desktop computers, laptop computers, a mobile device, and/or other endpoint devices used by users (e.g., 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Lumia® or similar product by the Nokia Corporation of Keilaniemi, Espoo, Finland, and/or (iii) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Android™ operating system developed by the Open Handset Alliance, (iii) the Windows Mobile™ operating system by Microsoft Corp. of Redmond, Washington, United States of America, or (iv) the Symbian™ operating system by Nokia Corp. of Keilaniemi, Espoo, Finland.

In many embodiments, dayparting management system 300 can include one or more input devices (e.g., one or more keyboards, one or more keypads, one or more pointing devices such as a computer mouse or computer mice, one or more touchscreen displays, a microphone, etc.), and/or can include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to dayparting management system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of dayparting management system 300. In a similar manner, the processors and/or the non-transitory computer-readable media can be local and/or remote to each other.

Meanwhile, in many embodiments, dayparting management system 300 also can be configured to communicate with and/or include one or more databases, such as database 305, and/or other suitable databases. The one or more databases can include a product database that contains information about products, items, or SKUs (stock keeping units), for example, among other data, such as historical SEM performance data, predicted performance data, dayparting time intervals, dayparting modifiers, and other suitable information, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between dayparting management system 300 and the one or more databases can be implemented using any suitable manner of wired and/or wireless communication. Accordingly, dayparting management system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In several embodiments, dayparting management system 300 can be in data communication through network 330 with search engines 360, which can include search engine 361-362, for example. For example, search engine 361 can be the Google search engine, and search engine 362 can be the Bing search engine. In many embodiments, search engines 360 each can provide SEM services, such as product listing advertisements and/or keyword (e.g., text) advertisements (branded and non-branded). These advertisements can be displayed along with or as part of SERPs provided by search engines 360 to users of search engines 360. In many embodiments, these advertisements can be used to drive web traffic to a website, such as an e-commerce website. SEM has become a major marketing vehicle for many retailers. For example, a retailer can have more than 67 million products listing advertisements and 90 million keyword advertisements on the Google and Bing search engines (e.g., 361-362), which can create 550 million possible impression opportunities per day.

Some search engines, such as Google and Bing, offer SEM dayparting. Dayparting is a way to split a day into multiple intervals (e.g., six different time intervals per day) and use a respective modifier of a base bid for search engine marketing (SEM) advertisement bids during each of those time intervals. For example, the base bid for a day can be $0.20, and on Monday the modifier can be set to 0.6 from 12-5 am hours, set to 0.9 from 5-9 am, set to 1.2 from 9-11 am, etc. The modifier acts as a scalar multiplier of the base bid for that time interval. Dayparting can adjust the ad bidding price globally based on various signals, such as RPC, return of ad spending (ROAS), order per minute (OPM), and/or other suitable signals to harvest more gross merchandise value (GMV) cost-effectively. For example, the dayparting modifier can serve as a global scaler to bid up (>1 modifier) or bid down (<1 modifier) to all ads of a selected SEM campaign, which can provide a fast-responding tool to manage ads bidding price. Dayparting can have significant impacts on the overall performance of SEM programs. Conventionally, dayparting management has relied heavily on manual operations, which is challenging due to both time-of-day effects during non-holiday time and demand surge in holiday time.

Figure 4:
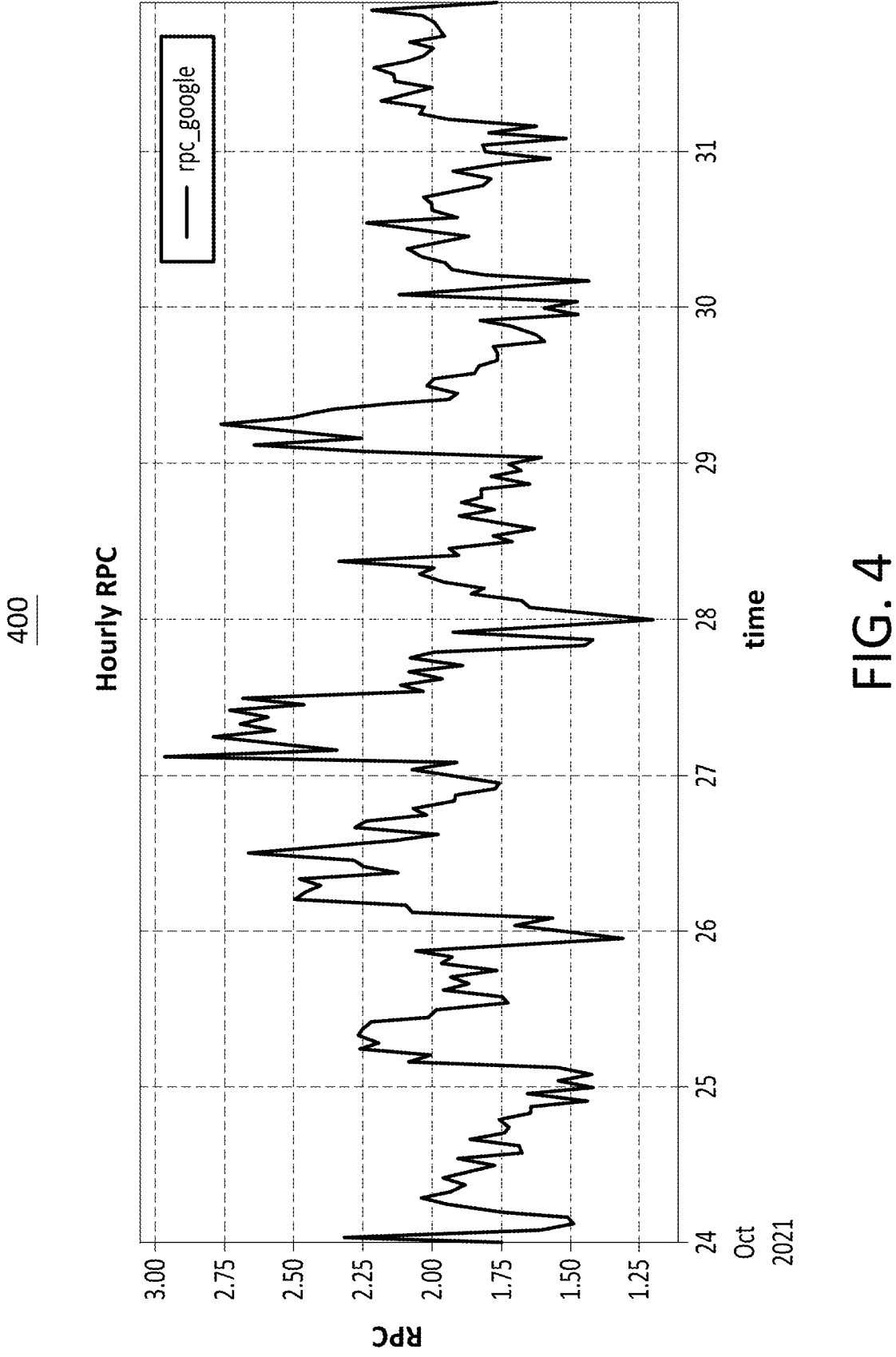
FIG. 4 illustrates a graph showing hourly RPC on Google on a website across an eight day non-holiday period.

Turning ahead in the drawings, FIG. 4 illustrates a graph 400 showing hourly RPC on Google on a website (Walmart.com) across an eight day non-holiday period extending from Oct. 24, 2021 to Oct. 31, 2021. As can be seen on FIG. 4, on many days, RPC decreases during the early morning hours, then increases during the later morning hours, then generally falls as the day continues. When the RPC is higher, it can be advantageous to bid higher, as clicks at that time are likely to generate more revenue.

Figure 5:
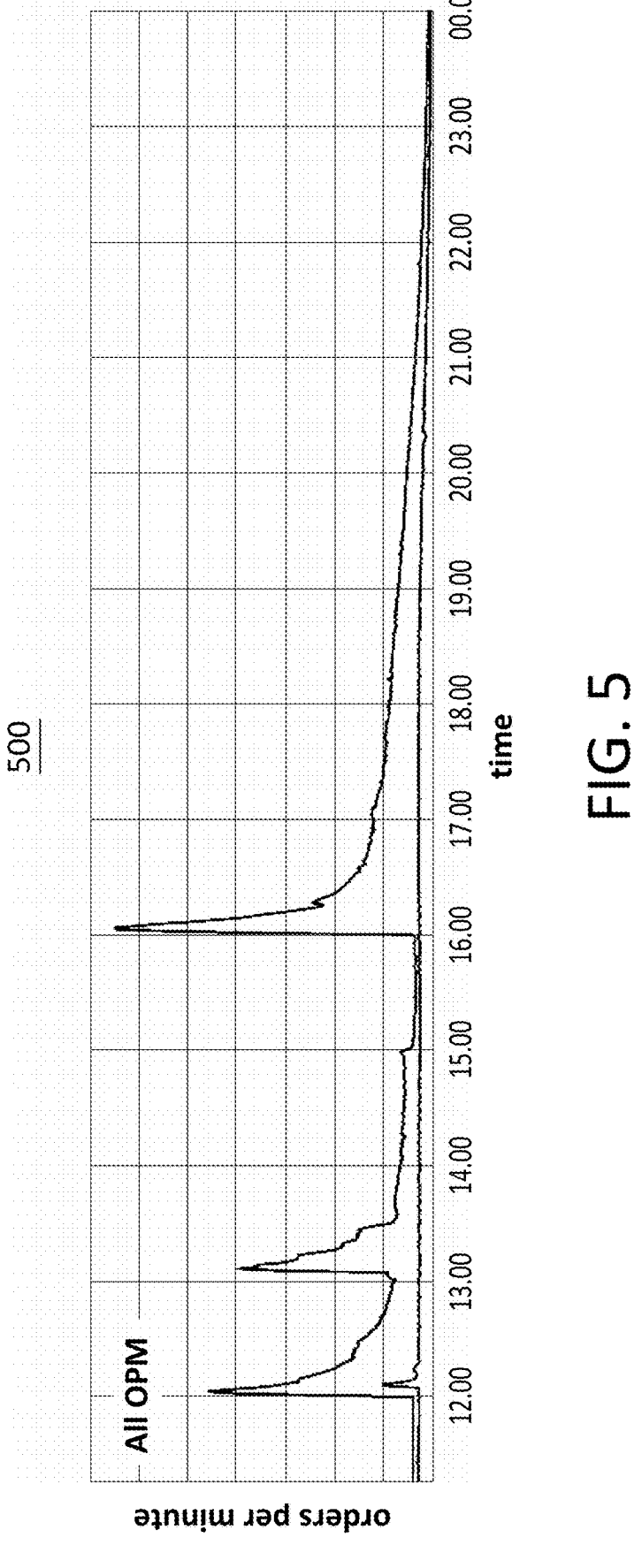
FIG. 5 illustrates a graph showing OPM on a website on a day during the holiday shopping season.

Turning ahead in the drawings, FIG. 5 illustrates a graph 500 showing OPM on a website (Walmart.com) on a day, Nov. 22, 2021, during the holiday shopping season. As can be seen on FIG. 5, there are spikes in the OPM during certain times of the day, which corresponded to times when "Black Friday"-related holiday deals went live, such as the release of the PlayStation 5 (PS5) video game console. When OPM is in a spike, it can be advantageous to set bids high.

In several embodiments, dayparting management system 300 can manage dayparting in an automated manner, which can be configured to maximize revenue per click (RPC), including handling normal-time operation mode and peak-time operation mode. In many embodiments, dayparting management system 300 can leverage novel machine learning algorithms and time-series forecasting methods to provide an automated dayparting management process to alleviate human efforts and errors. In a number of embodiments, dayparting management system 300 can handles both non-holiday time-of-day effects as well as demand surge during holidays and/or during other times of peak demand, which can improve the effectiveness and efficiency of the SEM program.

Figure 6:
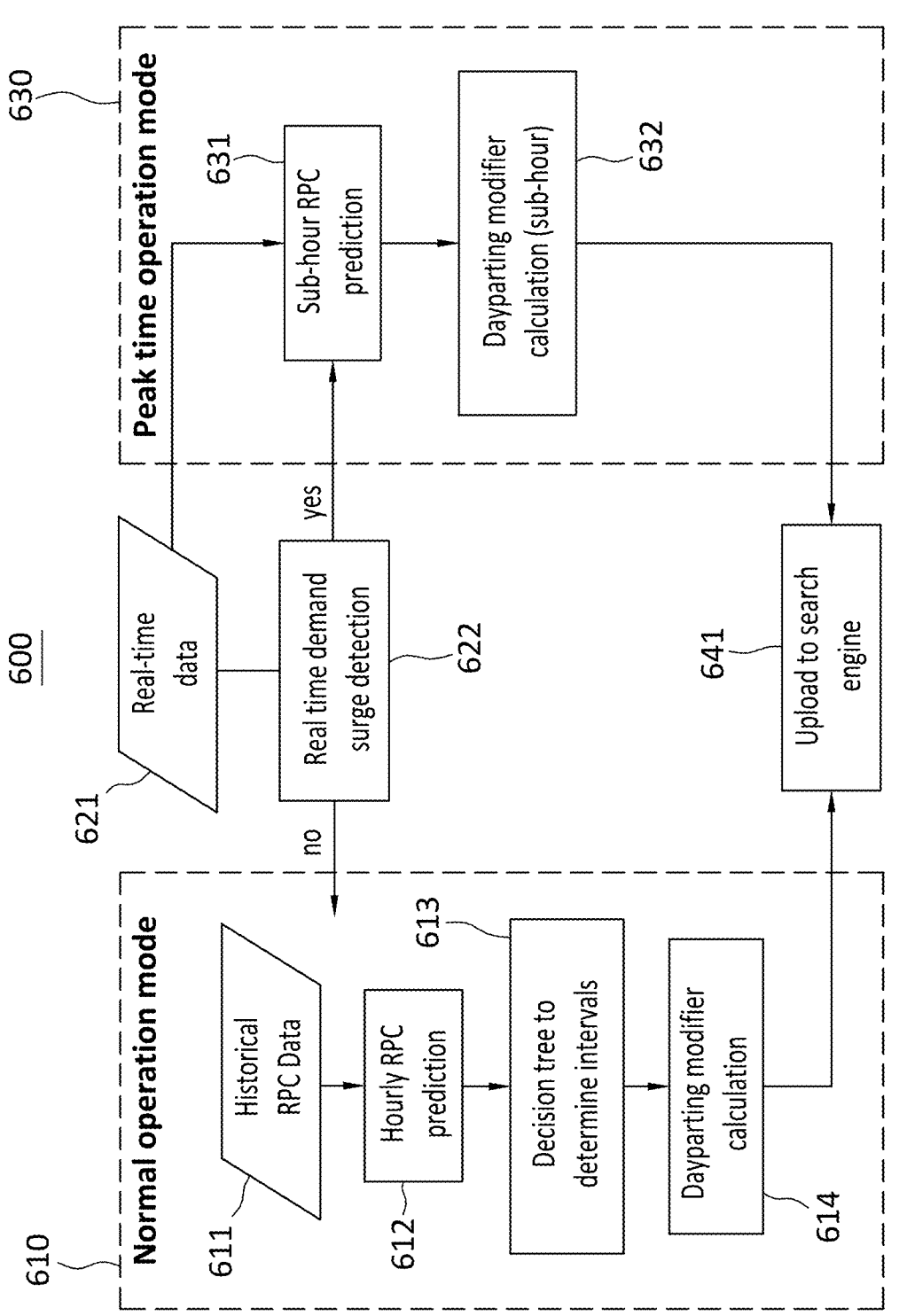
FIG. 6 illustrates a flow chart for a method of providing real-time dayparting management, according to an embodiment.

Turning ahead in the drawings, FIG. 6 illustrates a flow chart for a method 600 of providing real-time dayparting management, according to an embodiment. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, dayparting management system 300 (FIG. 3) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of dayparting management system 300 (FIG. 3). The processor(s) can be similar or identical to the processor(s) described above with respect to computer system 100 (FIG. 1).

In some embodiments, method 600 and other activities in method 600 can include using a distributed network including distributed memory architecture to perform the associated activity. This distributed architecture can reduce the impact on the network and system resources to reduce congestion in bottlenecks while still allowing data to be accessible from a central location.

Referring to FIG. 6, method 600 can include a normal operation mode 610, which can include activities 611-614, described below, and can include a peak time operation mode 630, which can include activities 631-632, described below. In several embodiments, normal operation mode 610 can be the active mode most of the time during normal operation, and peak time operation mode 630 can be the active mode during times of demand surges, such as holiday periods or other time periods that cause demand surges. Switching between the two modes (e.g., 610, 630) can be based on a real-time demand surge detection model performed in activity 622, described below. In a number of embodiments, activities 621-622 can be performed to determine which mode (e.g., 610, 630) to use for the current operation mode, and activity 641 can be used by both normal operation mode 610 and peak operation mode 630.

In a number of embodiments, normal operation mode 610 can include activity 611 of obtaining historical RPC data. The RPC data can be similar or identical to the RPC data shown in graph 400 (FIG. 4).

In several embodiments, normal operation mode 610 also can include activity 612 of generating hourly RPC prediction data. The hourly RPC prediction data can be the predicted RPC for each hour of a particular time period (e.g., a day, week, etc.). In some embodiments, the hourly RPC prediction data also can include a prediction of the number of clicks for each hour of the time period. In many embodiments, activity 612 can generate the hourly RPC prediction data based on the historical data obtained in activity 611. In many embodiments, activity 612 can include performing a time-series prediction model, which can train and predict in a rolling-horizon manner, as shown in FIG. 9.

Figures 9, 10:
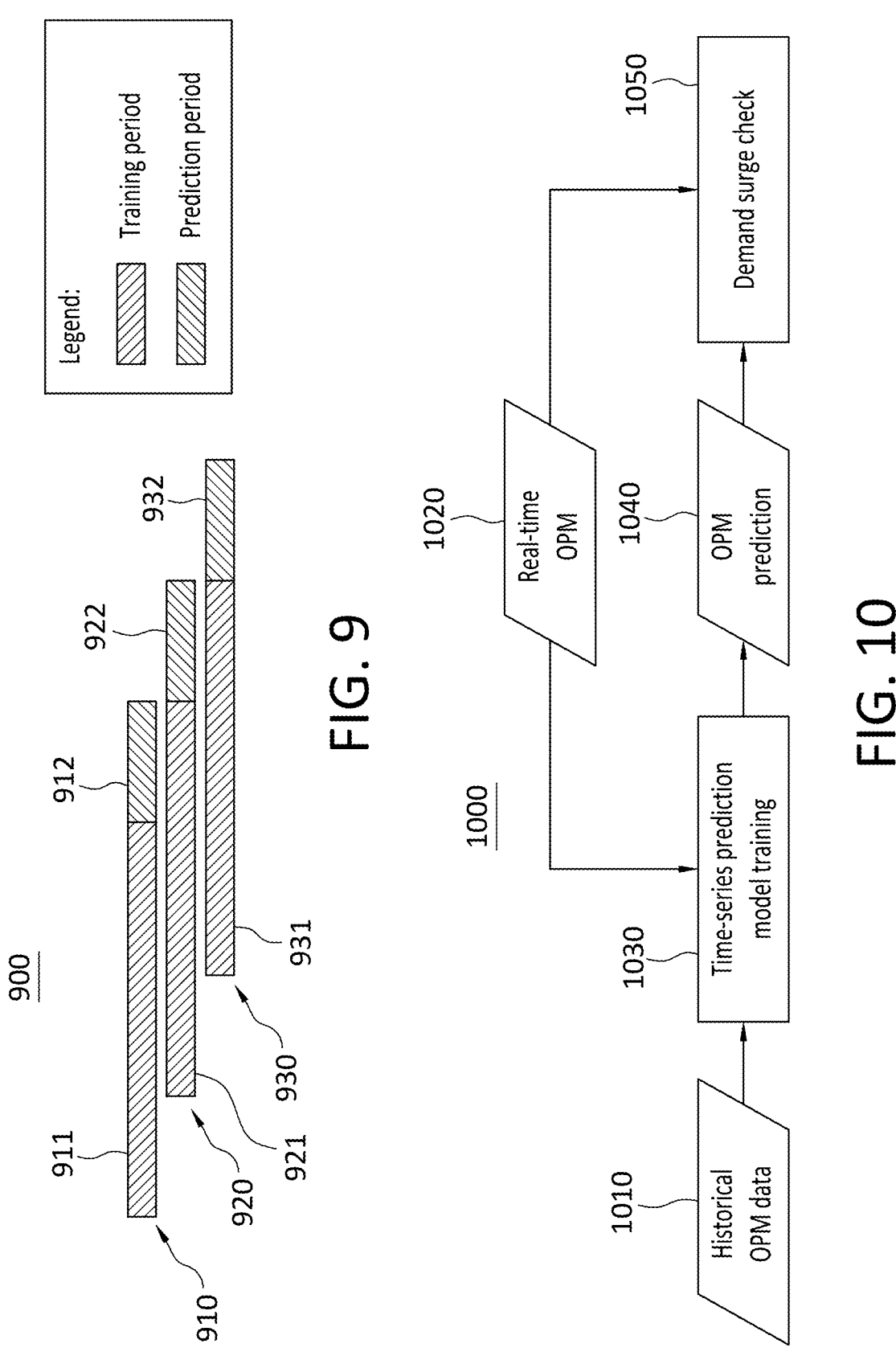
FIG. 9 illustrates a timeline showing a rolling horizon-approach to train and predict.
FIG. 10 illustrates a flow chart for a method of performing real-time demand surge detection, according to an embodiment.

Jumping ahead in the drawings, FIG. 9 illustrates a timeline 900 showing a rolling horizon-approach to train and predict. Timeline 900 includes a dataset 910 for a first time period. Dataset 910 includes RPC data from a training period 911 and a prediction period 912 that occurs after training period 911. Timeline 900 also include a dataset 920 for a second time period, which starts after the start of the first time period (e.g., before the start of training period 911), but before the end of training period 911. Dataset 920 includes RPC data from a training period 921 and a prediction period 922 that occurs after training period 921. Training period 921 includes the RPC data from prediction period 912. Prediction period 922 can begin when prediction period 912 ends. Timeline 900 also includes a dataset 930 for a third time period, which starts after the start of the second time period (e.g., before the start of training period 921), but before the end of training period 921. Dataset 930 includes RPC data from a training period 931 and a prediction period 932 that occurs after training period 931. Training period 931 includes the RPC data from prediction period 922.

As time progresses in series, the time-series prediction model is thus trained to generate prediction data for a subsequent period, and that prediction period then becomes part of the training period. In some embodiments, the time-series prediction model can be implemented using the Facebook Prophet open source package, which is available at https://github.com/facebook/prophet. In a number of embodiments, the time-series prediction model can generate hourly prediction for RPC and/or clicks. For example, the hourly RPC for the next week can be predicted based on historical RPC data.

Returning to FIG. 6, in several embodiments, normal operation mode 610 also can include activity 613 of determining time intervals using a decision tree. In some embodiments, the time intervals can be a specific number of time intervals for each day (e.g., 24-hour period) or each week (e.g., 168 hour period). For example, the decision tree can split the 24 hours into 6 time intervals, or another suitable number of intervals, which in some embodiments can be limited by the dayparting system of the relevant third-party search engine. In many embodiments, activity 613 can be implemented as shown in FIG. 7.

Figures 7, 8:
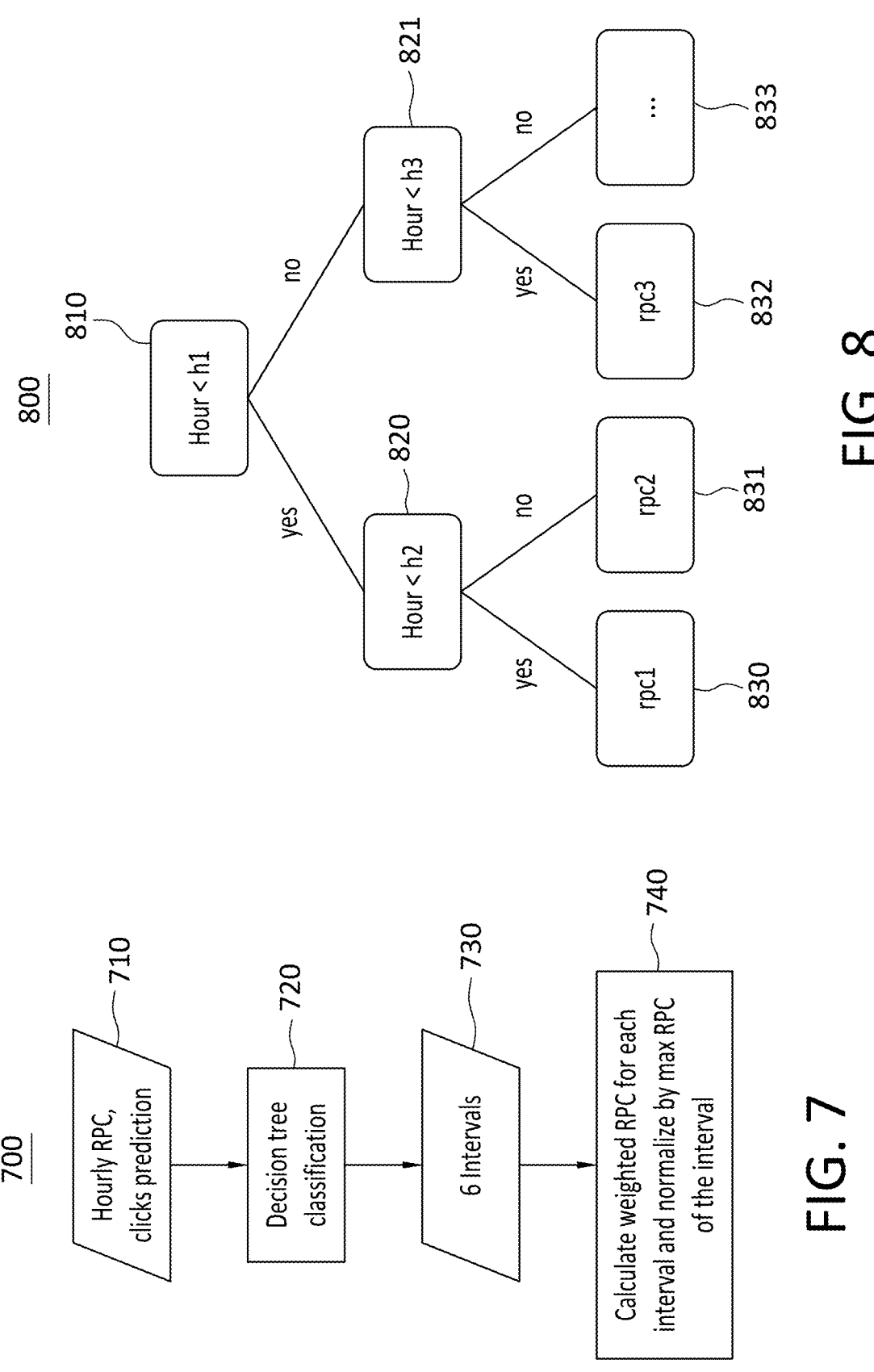
FIG. 7 illustrates a flow chart for a method of determining time intervals using a decision tree, according to an embodiment.
FIG. 8 illustrates an exemplary decision tree.

Turning ahead in the drawings, FIG. 7 illustrates a flow chart for a method 700 of determining time intervals using a decision tree, according to an embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped.

Referring to FIG. 7, method 700 can include an activity 710 of obtaining hourly RPC prediction data. The hourly RPC prediction data can be the data generated in activity 612.

In a number of embodiments, method 700 also can include an activity 720 of performing a decision tree classification. In many embodiments, the decision tree classification can be performed using a decision tree, such as decision tree 800 shown in FIG. 8. FIG. 8 illustrates an exemplary decision tree 800. Decision tree 800 is merely exemplary, and implementations of the decision tree are not limited to the decision tree depicted. Decision tree 800 can include a decision node 810, which can test whether the hour being tested is less than a first cutting hour h1 (e.g., hour 7 of the 24 hours of the day). Decision tree 800 also can include a decision node 820, which can test whether the hour being tested is less than a second cutting hour h2 (e.g., hour 14 of the 24 hours of the day). Decision tree 800 also can include a decision node 821, which can test whether the hour being tested is less than a third cutting hour h3 (e.g., hour 20 of the 24 hours of the day). The decision tree (e.g., 800) can include additional decision nodes (e.g., 910, 820, 821), and can include up to a predetermined number of leaf nodes (e.g., 830-833). When activity 720 is determining six time intervals, the decision tree can include up to six leaf nodes. The leaf nodes can be the revenue per click for that interval defined by the decision tree. For example, leaf node 830 can be rpc1, which can be the average RPC for time interval 1.

In many embodiments, the decision tree can be trained using the hourly RPC prediction data (e.g., from activity 710) to determine the cuts (e.g., h1, h2, h3, etc.) that define the time intervals, which can be output in an activity 730 of outputting the time intervals. In many embodiments, the decision tree can be trained to minimize the following loss function:

$$\min \sum_{t=1}^{24} [(rpc_t - rpc_{interval}) * \text{click}_t]^2,$$

where t represents an hour of the day from 1 to 24, $rpc_t$ is the RPC at time t (i.e., hourly RPC), $rpc_{interval}$ is the RPC averaged across a time interval t, and $\text{click}_t$ is a weight for time interval t. In some embodiments, the weight can be the total number of clicks during the time interval t. This loss function can minimize the difference between the hourly RPC and the average RPC for the interval. The training of decision tree 800 with the loss function will determine whether setting cut h1 to hour 13 instead of hour 14, for example, will result in a lower loss.

For example, based on the hourly RPC predicted for a particular day, the time intervals could be determined to be 1-5, 6-8, 9-11, 12-14, 15-18, and 19-24.

In several embodiments, the weighted RPC for each interval and normalize by the maximum RPC of the interval. The weight ($\text{click}_t$) can beneficially assist in selecting time intervals that focus on minimizing the difference during time intervals that have a high number of clicks, as it can be more advantageous to select time intervals in which the time intervals with a high number of clicks are more accurate than time intervals with a low number of clicks. In many embodiments the Python scikit-learn package, which is available at https://scikit-learn.org/, can be used to implement the decision tree interval determination.

In several embodiments, method 700 can include an activity 740 of calculating the weighted RPC for each time interval and normalizing by the max RPC of the time interval. The weighted RPC ($RPC_{weighted}$) of the $i^{th}$ time interval ($T_i$) can be derived according to:

$$RPC_{weighted}(T_i) = \frac{\sum_{t \in T_i} GMV_t}{\sum_{t \in T_i} \text{click}_t},$$

where $GMV_t$ represents GMV of hours belonging to $i^{th}$ time interval and $\text{click}_t$ is the clicks of hours belonging to $i^{th}$ time interval.

In some embodiments, a dayparting modifier corresponding to each interval can be calculated by normalizing the weighted RPC by the maximum weighted RPC of all time intervals, in the following way:

$$\text{modifier}(T_i) = \frac{RPC_{weighted}(T_i)}{\max(RPC_{weighted})},$$

where modifier ($T_i$) is the dayparting modifier for $i^{th}$ time interval, $RPC_{weighted}(T_i)$ is the weighted RPC for $i^{th}$ time interval while $\max(RPC_{weighted})$ represents the maximum weighted RPC of the 6 intervals.

Returning to FIG. 6, in a number of embodiments, normal operation mode 610 also can include activity 614 of calculating a dayparting modifier for each time interval determined in activity 613. In many embodiments, the dayparting modified can be calculated as described above in connection with activity 740.

In many embodiments, method 600 can include activity 641 of uploading the time intervals and associated dayparting modifiers to a third-party search engine (e.g., Google, Bing), to schedule dayparting according to the automated time intervals and modifiers determined in activities 613, 614, 730 (FIG. 7), and/or 740 (FIG. 7). These time intervals and modifiers can be used while in normal operation mode, as can be updated periodically, e.g., daily, weekly, or another suitable time period.

In a number of embodiments, method 600 can include activity 621 of obtaining real-time data, such as real-time RPC and/or OPM data. The RPC data can be similar or identical to the RPC data shown in graph 400 (FIG. 4), but can be current data, such as the RPC data within the last 30 minutes, 15 minutes, 10 minutes, 5 minutes, 3 minutes, or 1 minute, for example. The OPM data can be similar or identical to the OPM data shown in graph 500 (FIG. 5), but can be current data, such as the OPM data within the last 30 minutes, 15 minutes, 10 minutes, 5 minutes, 3 minutes, or 1 minute, for example. This data can be used in activities 622 and/or 631, described below.

In several embodiments, method 600 can include activity 622 of performing real-time demand surge detection, which can determine whether or not there is a surge in demand that warrants switching to peak time operation mode 630. In many embodiments, activity 622 can be implemented by method 1000, as shown in FIG. 1000.

Jumping ahead in the drawings, FIG. 10 illustrates a flow chart for a method 1000 of performing real-time demand surge detection, according to an embodiment. Method 1000 is merely exemplary and is not limited to the embodiments presented herein. Method 1000 can be employed in many different embodiments or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped.

Referring to FIG. 10, method 1000 can include an activity 1010 of obtaining historical OPM data. The historical OPM data can be similar or the OPM data shown in graph 500 (FIG. 5).

In many embodiments, method 1000 also can include an activity 1020 of obtaining real-time OPM data. The real-time OPM data can be the real-time OPM data obtained in activity 621.

In several embodiments, method 1000 additionally can include an activity 1030 of performing time-series prediction model training. The real-time OPM data can be the real-time OPM data obtained in activity 621. In some embodiments, the time-series prediction model can be the ARIMA (Autoregressive Integrated Moving Average) model, or another suitable model. The time-series prediction model can make real-time OPM predictions. The ARIMA model can make prediction based on past observations following the equation:

$$X_t = \alpha_1 X_{t-1} + \ldots + \alpha_p X_{t-p} + \varepsilon_t + \theta_1 \varepsilon_{t_1} + \ldots + \theta_q \varepsilon_{t-q},$$

where $X_t$ is the prediction for time step t, $X_{t-i}$ (i=1, 2, . . . p) is the observation for the past time step, $\alpha_i$ is the regression coefficient, p is the total lagged time steps used for regression, $\theta_i$ (i=1, 2, . . . q) is the coefficient for moving average process, $\varepsilon$'s are IID (independent and identically distributed) zero-mean Gaussian variables, and q is the total lagged time steps used for moving average.

In many embodiments, method 1000 further can include an activity 1040 of outputting an OPM prediction, which can be generated using the time-series prediction model that was trained in activity 1030. The OPM prediction can predict the OPM that is expected at a various times, such as the OPM that is predicted for the next 15 minutes.

In several embodiments, method 1000 additionally can include an activity 1050 of performing a demand surge check. In a number of embodiments, the demand surge check can receive the OPM prediction determined in activity 1040 and an observation of the current real-time OPM, based on the real-time OPM data obtained in activity 1020, to determine if demand surge is happening. In many embodiments, activity 1050 can be performed as shown in method 1100.

Figure 11:
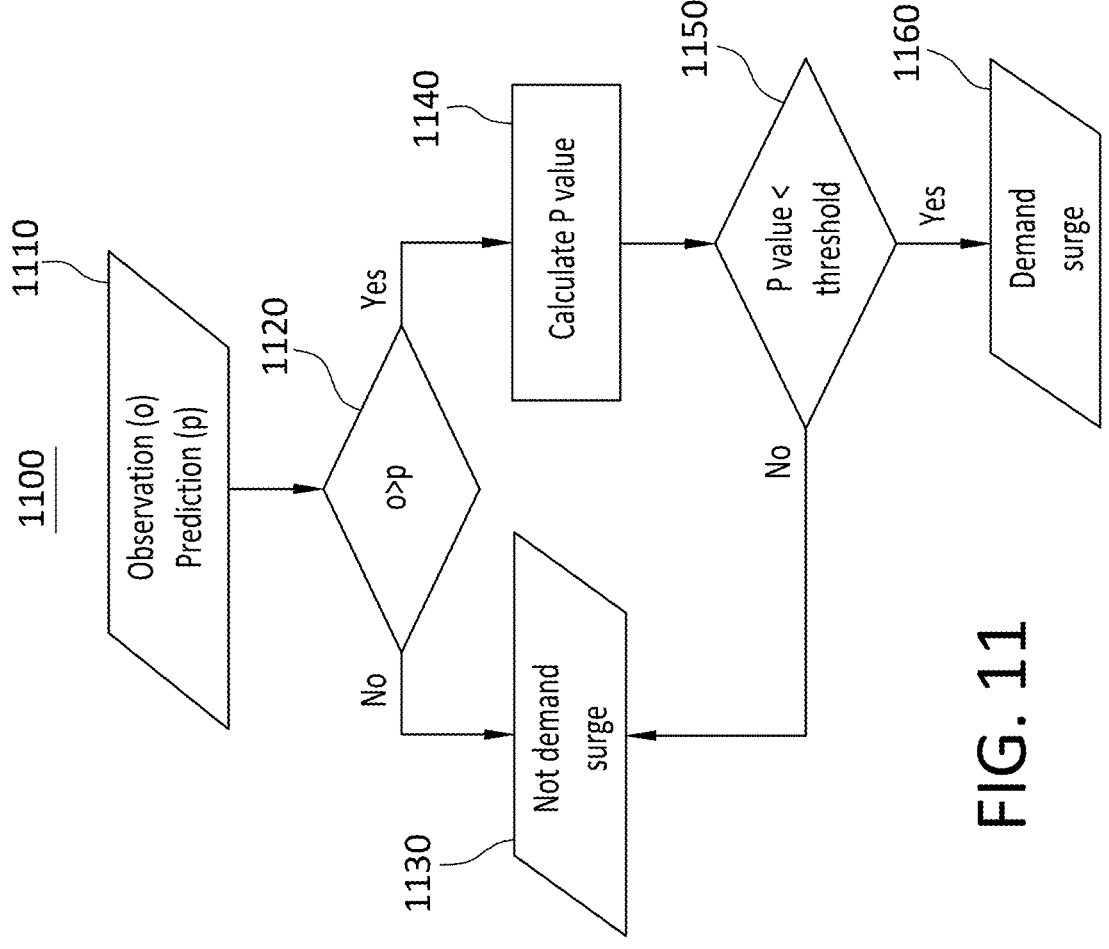
FIG. 11 illustrates a flow chart for a method of performing a demand surge check, according to an embodiment.

Turning ahead in the drawings, FIG. 11 illustrates a flow chart for a method 1100 of performing a demand surge check, according to an embodiment. Method 1100 is merely exemplary and is not limited to the embodiments presented herein. Method 1100 can be employed in many different embodiments or examples not specifically depicted or described herein. In some embodiments, the procedures, the processes, and/or the activities of method 1100 can be performed in the order presented. In other embodiments, the procedures, the processes, and/or the activities of method 1100 can be performed in any suitable order. In still other embodiments, one or more of the procedures, the processes, and/or the activities of method 1100 can be combined or skipped.

Referring to FIG. 11, method 1100 can include an activity 1110 of obtaining observation data (o) and prediction data (p). The observation data (o) can be the real-time OPM data obtained in activity 1020 (FIG. 10). The prediction data (p) can be the OPM prediction data determined in activity 1040 (FIG. 10).

In several embodiments, method 1100 can include an activity 1120 of comparing the observation data (o) exceeds the prediction data (p) to determine whether the observation data (o) exceeds the prediction data (p). If so, the observed OPM is higher than expected. If the observation data (o) does not exceed the prediction data (p), method 1120 proceed to an activity 1130 of outputting that there is no demand surge. If the observation data (o) exceeds the prediction data (p), then method 1100 can proceed to an activity 1140 of calculating a P value.

Figure 12:
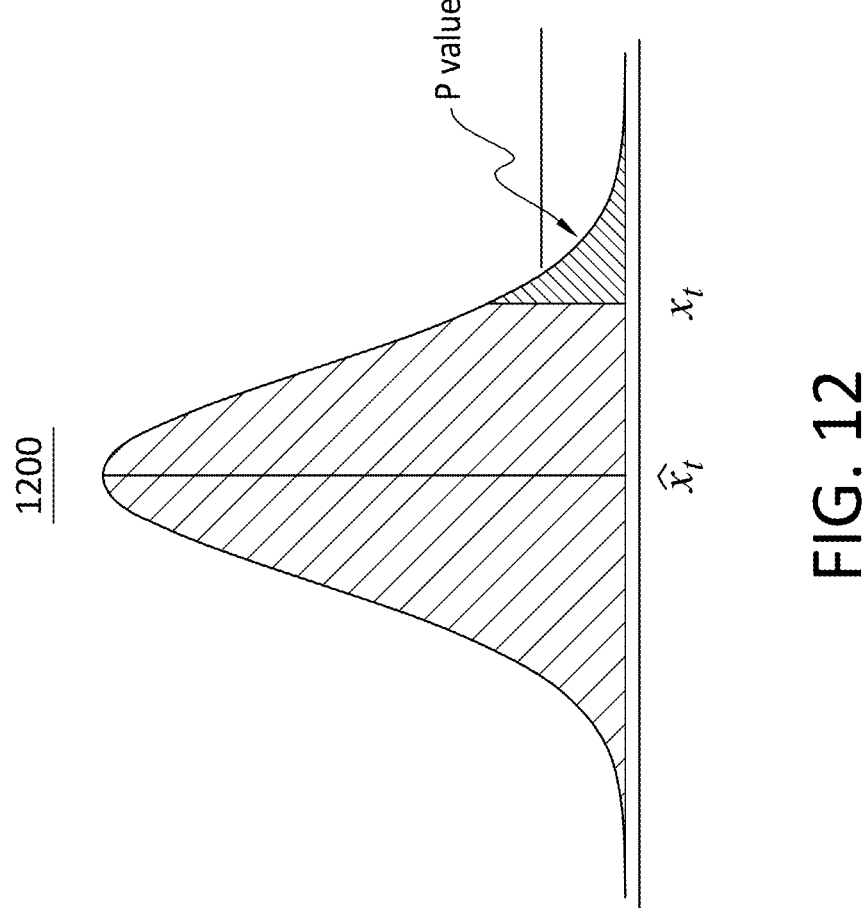
FIG. 12 illustrates a graph 1200 showing a normal distribution of the predicted OPM data.

Turning ahead in the drawings, FIG. 12 illustrates a graph 1200 showing a normal distribution of the predicted OPM data. The P value indicates the probability of the discrepancy between the prediction data (p) and the observation data (o) assuming normal distribution. The probability density function for normal distribution is:

$$f(x) = \frac{1}{\sigma\sqrt{2\pi}} e^{-\frac{1}{2}\left(\frac{x-\mu}{\sigma}\right)^2},$$

where $\mu$ is the mean of the distribution, $\sigma$ is the standard deviation. The mean of the distribution is the prediction $\hat{x}_t$ for time step t, and the standard deviation can be known. Given the observation $x_t$ for time step t, the associated P value can be calculated as:

$$P = 1 - \int_{-\infty}^{x_t} \frac{1}{\sigma\sqrt{2\pi}} e^{-\frac{1}{2}\left(\frac{x-\hat{x}_t}{\sigma}\right)^2} dx.$$

In some embodiments, this calculation is can be done with the scipy package, which is available at https://scipy.org/.

The P value can be represented by the area under the normal distribution curve to the right of observation $x_t$.

In several embodiments, method 1100 can include an activity 1150 of determining whether the P value is less than a predetermined threshold. In some embodiments, the threshold can be 0.001 or another suitable value. The threshold can be used to limit the demand surge to times when the observation data (o) is a statistical outlier compared to what was predicted in the prediction data (p). If the P value is not less than the predetermined threshold, then method 1100 can proceed to activity 1130 of outputting that there is no demand surge. Otherwise, when the P value is less than the predetermined threshold, then method 1100 can proceed to activity 1150 of outputting that there is a demand surge.

Returning to FIG. 6, when activity 622 indicates that there is no demand surge, the operation mode can continue in, or switch to, normal operation mode 610. When activity 622 indicates that there is a demand surge, the operation mode can continue in, or switch to, peak time operation mode 630.

In several embodiments, peak time operation mode 630 can include activity 631 of determining a sub-hour RPC prediction. The RPC prediction can be based on a portion of an hour, such as 1 minute, 2 minutes, 3 minutes, 5 minutes, 10 minutes, minutes, 20 minutes, 30 minutes, or another suitable sub-hour time interval. In many embodiments, real-time RPC data can be used to determine the RPC prediction for the sub-hour time interval.

In several embodiments, peak time operation mode 630 also can include activity 633 of determining a sub-hour dayparting modifier, which can be similar to activities 614 (FIG. 6) and/or 740 (FIG. 7), but can be on a sub-hour basis for the sub-hour time interval used in activity 631. In many embodiments, this sub-hour dayparting modifier can be uploaded to the search engine in activity 641 for the current time. In many embodiments, a new dayparting plan, with updated dayparting modifiers, can be uploaded multiple times within the hour to update the current modifier, which can bypass the dayparting modifier that would otherwise be used under normal operation mode 610, and which can allow the dayparting system to be updated with different modifiers at a sub-hour level. For example, every 10 minutes during a demand surge, a new dayparting job can be submitted to the search engine to update the current modifier to deal with rapidly changing demand.

Turning ahead in the drawings, FIG. 13 illustrates a flow chart for a method 1300 of providing real-time dayparting management, according to an embodiment. Method 1300 is merely exemplary and is not limited to the embodiments presented herein. Method 1300 can be employed in many different embodiments or examples not specifically depicted or described herein. In some embodiments, the procedures, the processes, and/or the activities of method 1300 can be performed in the order presented. In other embodiments, the procedures, the processes, and/or the activities of method 1300 can be performed in any suitable order. In still other embodiments, one or more of the procedures, the processes, and/or the activities of method 1300 can be combined or skipped.

In many embodiments, dayparting management system 300 (FIG. 3) can be suitable to perform method 1300 and/or one or more of the activities of method 1300. In these or other embodiments, one or more of the activities of method 1300 can be implemented as one or more computing instructions configured to run at one or more processors and configured to be stored at one or more non-transitory computer readable media. Such non-transitory computer readable media can be part of dayparting management system 300 (FIG. 3). The processor(s) can be similar or identical to the processor(s) described above with respect to computer system 100 (FIG. 1).

In some embodiments, method 1300 and other activities in method 1300 can include using a distributed network including distributed memory architecture to perform the associated activity. This distributed architecture can reduce the impact on the network and system resources to reduce congestion in bottlenecks while still allowing data to be accessible from a central location.

Referring to FIG. 13, method 1300 can include an activity 1305 of obtaining historical revenue per click (RPC) data. Activity 1305 can be similar or identical to activity 611 (FIG. 6).

In a number of embodiments, method 1300 also can include an activity 1310 of generating hourly RPC prediction data for a predetermined time period based on the historical RPC data. Activity 1310 can be similar or identical to activity 612 (FIG. 6). In some embodiments, activity 1310 of generating the hourly RPC prediction data for the predetermined time period can include using a time-series forecasting model trained using rolling-horizon training and prediction.

In several embodiments, method 1300 additionally can include an activity 1315 of determining (i) time intervals from within the predetermined time period and (ii) a respective modifier for each of the time intervals, based on the hourly RPC prediction data. Activity 1315 can be similar or identical to activities 613 (FIG. 6), 614 (FIG. 6), activity 710 (FIG. 7), activity 720 (FIG. 7), activity 730 (FIG. 7), and/or activity 740 (FIG. 7). In a number of embodiments, activity 1315 of determining the time intervals from within the predetermined time period further can include using a decision tree classification model to determine the time intervals, which can be similar or identical to activity 613 (FIG. 6), activity 720 (FIG. 6), and/or activity 730 (FIG. 7). In a number of embodiments, using the decision tree classification model to determine the time intervals further can include using a loss function to minimize a difference between (i) hourly RPCs for a time interval of the time intervals and (ii) an average RPC for the time interval. The loss function can be similar or identical to the loss function described above in connection with activities 720-730 (FIG. 7). In some embodiments, using the loss function further can include weighting each hour of the time interval in the loss function based on a respective magnitude of each of the hourly RPCs. For example, the weighting can be similar to $click_t$ described above in connection with activities 720-740 (FIG. 7).

In a number of embodiments, method 1300 further can include an activity 1320 of uploading the time intervals and the respective modifiers for the time intervals to a dayparting system of a search engine. Activity 1320 can be similar or identical to activity 641 (FIG. 6). The search engine can be similar or identical to search engines 360 (FIG. 3).

In several embodiments, method 1300 optionally can include an activity 1325 of obtaining real-time observed orders per minute (OPM) data. Activity 1325 can be similar or identical to activities 621 (FIG. 6) and/or 1020 (FIG. 10).

In a number of embodiments, method 1300 further can include an activity 1330 of determining, in real-time, whether a demand surge exists based on the real-time observed OPM data. Activity 1330 can be similar or identical to activities 622 (FIG. 6) and/or method 1100 (FIG. 11). In many embodiments, activity 1330 can be implemented as shown in FIG. 14.

Figure 14:
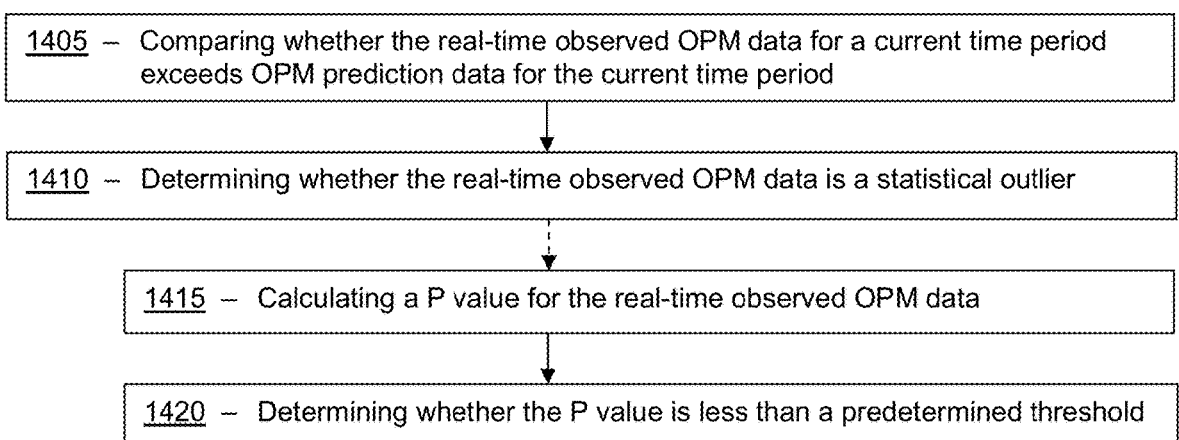
FIG. 14 illustrates a flow chart for an activity of FIG. 13 of determining, in real-time, whether a demand surge exists based on the real-time observed OPM data.

Turning ahead in the drawings, FIG. 14 illustrates a flow chart for activity 1330 of determining, in real-time, whether a demand surge exists based on the real-time observed OPM data. Activity 1330 is merely exemplary and is not limited to the embodiments presented herein. Activity 1330 can be employed in many different embodiments or examples not specifically depicted or described herein. In some embodiments, the procedures, the processes, and/or the activities of activity 1330 can be performed in the order presented. In other embodiments, the procedures, the processes, and/or the activities of activity 1330 can be performed in any suitable order. In still other embodiments, one or more of the procedures, the processes, and/or the activities of activity 1330 can be combined or skipped.

Referring to FIG. 14, activity 1330 can include an activity 1405 of comparing whether the real-time observed OPM data for a current time period exceeds OPM prediction data for the current time period. Activity 1405 can be similar or identical to activity 1110 (FIG. 11). In a number of embodiments, the OPM prediction data can be generated using a time-series prediction machine-learning model, such as described in connection with activity 1040 (FIG. 1040).

In a number of embodiments, when the real-time observed OPM data for the current time period exceeds the OPM prediction data for the current time period, activity 1330 also can include an activity 1410 of determining whether the real-time observed OPM data is a statistical outlier for the OPM prediction data. Activity 1410 can be similar or identical to activities 1120, 1140, and/or 1150 (FIG. 11).

In several embodiments, activity 1410 can include an activity 1415 of calculating a P value for the real-time observed OPM data based on the OPM prediction data. Activity 1415 can be similar or identical to activity 1140 (FIG. 11).

In a number of embodiments, activity 1410 also can include an activity 1420 of determining whether the P value is less than a predetermined threshold. Activity 1420 can be similar or identical to activity 1150 (FIG. 11).

Returning to FIG. 13, in several embodiments, when the demand surge exists, method 1300 further can include an activity 1335 of generating, in real-time, a sub-hour RPC prediction for a first sub-hour time interval. Activity 1335 can be similar or identical to activity 631 (FIG. 6).

In a number of embodiments, method 1300 further can include an activity 1340 of determining, in real-time, a first surge modifier for the first sub-hour time interval. Activity 1340 can be similar or identical to activity 632 (FIG. 6).

In several embodiments, method 1300 additionally can include an activity 1345 of uploading, in real-time, the first surge modifier to the dayparting system of the search engine to bypass the time intervals and the respective modifiers. Activity 1345 can be similar or identical to activity 641 (FIG. 6).

In a number of embodiments, method 1300 further can include an activity 1350 of determining a second surge modifier for a second sub-hour time interval. The first sub-hour time interval and the second sub-hour time interval can be within a single hour. Activity 1350 can be similar or identical to activity 632 (FIG. 6).

In several embodiments, method 1300 further can include an activity 1355 of uploading the second surge modifier to the dayparting system of the search engine to bypass the first surge modifier. Activity 1355 can be similar or identical to activity 641 (FIG. 6).

Returning to FIG. 3, in several embodiments, communication system 301 can at least partially perform activity 611

(FIG. 6) of obtaining historical RPC data, activity 641 (FIG. 6) of uploading the time intervals and associated dayparting modifiers to a third-party search engine, activity 621 (FIG. 6) of obtaining real-time data, activity 1010 (FIG. 10) of obtaining historical OPM data, activity 1020 (FIG. of obtaining real-time OPM data, activity 1305 (FIG. 13) of obtaining historical revenue per click (RPC) data, activity 1320 (FIG. 13) of uploading the time intervals and the respective modifiers for the time intervals to a dayparting system of a search engine, activity 1325 (FIG. 13) of obtaining real-time observed orders per minute (OPM) data, activity 1345 (FIG. 13) of uploading, in real-time, the first surge modifier to the dayparting system of the search engine to bypass the time intervals and the respective modifiers, and/or activity 1355 (FIG. 13) of uploading the second surge modifier to the dayparting system of the search engine to bypass the first surge modifier.

In several embodiments, performance system 302 can at least partially perform activity 612 (FIG. 6) of generating hourly RPC prediction data, activity 622 (FIG. 6) of performing real-time demand surge detection, activity 1010 (FIG. 10) of obtaining historical OPM data, activity 1020 (FIG. 10) of obtaining real-time OPM data, activity 1030 (FIG. 10) of performing time-series prediction model training, activity 1040 (FIG. 10) of outputting an OPM prediction, activity 1050 (FIG. 10) of performing a demand surge check activity 1110 (FIG. 11) of obtaining observation data (o) and prediction data (p), activity 1120 (FIG. 11) of comparing the observation data (o) exceeds the prediction data (p) to determine whether the observation data (o) exceeds the prediction data (p), activity 1130 (FIG. 11) of outputting that there is no demand surge, activity 1140 (FIG. 11) of calculating a P value, activity 1150 of (FIG. 11) determining whether the P value is less than a predetermined threshold, activity 1310 (FIG. 13) of generating hourly RPC prediction data for a predetermined time period based on the historical RPC data, activity 1325 (FIG. 13) of obtaining real-time observed orders per minute (OPM) data, activity 1330 (FIG. 13) of determining, in real-time, whether a demand surge exists based on the real-time observed OPM data, activity 1405 (FIG. 14) of comparing whether the real-time observed OPM data for a current time period exceeds OPM prediction data for the current time period, activity 1410 (FIG. 14) of determining whether the real-time observed OPM data is a statistical outlier for the OPM prediction data, activity 1415 (FIG. 14) of calculating a P value for the real-time observed OPM data based on the OPM prediction data, and/or activity 1420 (FIG. 14) of determining whether the P value is less than a predetermined threshold.

In a number of embodiments, normal operation system 303 can at least partially perform normal operation mode 610, activity 611 (FIG. 6) of obtaining historical RPC data, activity 612 (FIG. 6) of generating hourly RPC prediction data, activity 613 (FIG. 6) of determining time intervals using a decision tree, activity 614 (FIG. 6) of calculating a dayparting modifier for each time interval, activity 710 (FIG. 7) of obtaining hourly RPC prediction data, activity 720 (FIG. 7) of performing a decision tree classification, activity 730 (FIG. 7) of outputting the time intervals, activity 740 (FIG. 7) of calculating the weighted RPC for each time interval and normalizing by the max RPC of the time interval, activity 1305 (FIG. 13) of obtaining historical revenue per click (RPC) data, activity 1310 (FIG. 13) of generating hourly RPC prediction data for a predetermined time period based on the historical RPC data, and/or activity 1315 (FIG. 13) of determining (i) time intervals from within the predetermined time period and (ii) a respective modifier for each of the time intervals, based on the hourly RPC prediction data.

In several embodiments, peak demand system 304 can at least partially perform peak time operation mode 630, activity 631 (FIG. 6) of determining a sub-hour RPC prediction, activity 633 (FIG. 6) of determining a sub-hour dayparting modifier, activity 1335 (FIG. 13) of generating, in real-time, a sub-hour RPC prediction for a first sub-hour time interval, activity 1340 (FIG. 13) of determining, in real-time, a first surge modifier for the first sub-hour time interval, and/or activity 1350 (FIG. 13) of determining a second surge modifier for a second sub-hour time interval.

In many embodiments, the techniques described herein can provide a practical application and several technological improvements. In some embodiments, the techniques described herein can provide for real-time dayparting management. The techniques described herein can provide a significant improvement over conventional approaches that are generally manual, error-prone, not based on current data, and utilizing limited data. In many embodiments, the techniques described herein can provide a machine-learning model for accurate RPC prediction. In several embodiments, the techniques described herein can provide demand surge detection using real-time data. In a number of embodiments, the techniques described herein can provide effective decision tree-based dayparting modifiers calculation. In several embodiments, the techniques described herein can provide an automated approach to managing dayparting, with support for normal operation and peak-time operation, with automatic switching based on automated demand surge detection.

In a number of embodiments, the techniques described herein can solve a technical problem that arises only within the realm of computer networks, as online ordering is a concept that do not exist outside the realm of computer networks. Moreover, the techniques described herein can solve a technical problem that cannot be solved outside the context of computer networks. Specifically, the techniques described herein cannot be used outside the context of computer networks, in view of a lack of data, the lack of SEM outside computer networks, and the inability to train the machine-learning recommendation models without a computer.

Various embodiments can include a system including one or more processors and one or more non-transitory computer-readable media storing computing instructions that, when executed on the one or more processors, cause the one or more processor to perform certain acts. The acts can include obtaining historical revenue per click (RPC) data. The acts also can include generating hourly RPC prediction data for a predetermined time period based on the historical RPC data. The acts additionally can include determining (i) time intervals from within the predetermined time period and (ii) a respective modifier for each of the time intervals, based on the hourly RPC prediction data. The acts further can include uploading the time intervals and the respective modifiers for the time intervals to a dayparting system of a search engine.

A number of embodiments can include a method being implemented via execution of computing instructions configured to run at one or more processors. The method can include obtaining historical revenue per click (RPC) data. The method also can include generating hourly RPC prediction data for a predetermined time period based on the historical RPC data. The method additionally can include determining (i) time intervals from within the predetermined time period and (ii) a respective modifier for each of the time intervals, based on the hourly RPC prediction data. The acts method can include uploading the time intervals and the respective modifiers for the time intervals to a dayparting system of a search engine.

Various embodiments can include a system including one or more processors and one or more non-transitory computer-readable media storing computing instructions that, when executed on the one or more processors, cause the one or more processors to perform certain operations. The operations can include obtaining real-time observed orders per minute (OPM) data. The operations also can include training a prediction model to make a real-time OPM prediction for a current time period, based on the real-time observed OPM data over past time steps based on lagged time steps in a moving average. The operations additionally can include determining, in real-time, whether a demand surge exists based on the real-time observed OPM data and the real-time OPM prediction, to generate a first surge modifier. The operations further can include when the demand surge exists, generating, in real-time, a sub-hour revenue per click (RPC) prediction for a first sub-hour time interval. The operations additionally can include determining, in real-time, the first surge modifier for the first sub-hour time interval. The operations further can include uploading, in real-time, the first surge modifier to a dayparting system of a search engine to bypass existing time intervals and modifiers.

A number of embodiments can include a method implemented via execution of computing instructions configured to run at one or more processors. The method can include obtaining real-time observed orders per minute (OPM) data. The method also can include training a prediction model to make a real-time OPM prediction for a current time period, based on the real-time observed OPM data over past time steps based on lagged time steps in a moving average. The method additionally can include determining, in real-time, whether a demand surge exists based on the real-time observed OPM data and the real-time OPM prediction, to generate a first surge modifier. The method further can include when the demand surge exists, generating, in real-time, a sub-hour revenue per click (RPC) prediction for a first sub-hour time interval. The method additionally can include determining, in real-time, the first surge modifier for the first sub-hour time interval. The method further can include uploading, in real-time, the first surge modifier to a dayparting system of a search engine to bypass existing time intervals and modifiers.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although real-time dayparting management has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-14 may be modified, and that the foregoing discussion of certain of these embodiments does not necessarily represent a complete description of all possible embodiments. For example, one or more of the procedures, processes, or activities of FIGS. 6, 7, 10, 11, 13, and 14 may include different procedures, processes, and/or activities and be performed by many different modules, in many different orders, and/or one or more of the procedures, processes, or activities of FIGS. 6, 7, 10, 11, 13, and 14 may include one or more of the procedures, processes, or activities of another different one of FIGS. 6, 7, 10, 11, 13, and 14. As another example, the systems within dayparting management system 300 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform operations comprising:
      obtaining real-time observed orders per minute (OPM) data;

training a prediction model to make a real-time OPM prediction for a current time period, based on the real-time observed OPM data over past time steps based on lagged time steps in a moving average;
      determining, in real-time, that a demand surge exists based on the real-time observed OPM data and the real-time OPM prediction, wherein the determining comprises:
         comparing the real-time observed OPM data to the real-time OPM prediction for the current time period; and
         responsive to determining that the real-time observed OPM data exceeds the real-time OPM prediction, determining that the real-time observed OPM data is a statistical outlier for the real-time OPM prediction and that the demand surge exists;
      responsive to the determination that the demand surge exists, generating, in real-time, a sub-hour revenue per click (RPC) prediction for a first sub-hour time interval;
      determining, in real-time, a first surge modifier for the first sub-hour time interval; and
      uploading, in real-time, the first surge modifier to a dayparting system of a search engine to bypass existing time intervals and modifiers.

2. The system of claim 1, wherein the determining that the real-time observed OPM data is the statistical outlier for the real-time OPM prediction comprises:
   calculating a P value for the real-time observed OPM data based on the real-time OPM prediction.

3. The system of claim 2, wherein the determining that the real-time observed OPM data is the statistical outlier for the real-time OPM prediction further comprises:
   determining that the P value is less than a threshold.

4. The system of claim 1, wherein the prediction model is a time-series prediction machine-learning model.

5. The system of claim 4, wherein the time-series prediction machine-learning model is an autoregressive integrated moving average (ARIMA) model.

6. The system of claim 1, wherein the operations further comprise:
   while the demand surge exists, determining a second surge modifier for a second sub-hour time interval, wherein the first sub-hour time interval and the second sub-hour time interval are within a single hour.

7. The system of claim 6, wherein the operations further comprise:
   while the demand surge exists, uploading the second surge modifier to the dayparting system of the search engine to bypass the first surge modifier.

8. A method implemented via execution of computing instructions configured to run at one or more processors, the method comprising:
   obtaining real-time observed orders per minute (OPM) data;
   training a prediction model to make a real-time OPM prediction for a current time period, based on the real-time observed OPM data over past time steps based on lagged time steps in a moving average;
   determining, in real-time, that a demand surge exists based on the real-time observed OPM data and the real-time OPM prediction, wherein the determining comprises:
      comparing the real-time observed OPM data to the real-time OPM prediction for the current time period; and responsive to determining that the real-time observed OPM data exceeds the real-time OPM prediction, determining that the real-time observed OPM data is a statistical outlier for the real-time OPM prediction and that the demand surge exists;

responsive to the determination that the demand surge exists, generating, in real-time, a sub-hour revenue per click (RPC) prediction for a first sub-hour time interval;

determining, in real-time, a first surge modifier for the first sub-hour time interval; and uploading, in real-time, the first surge modifier to a dayparting system of a search engine to bypass existing time intervals and modifiers.

9. The method of claim 8, wherein the determining that the real-time observed OPM data is the statistical outlier for the real-time OPM prediction comprises:

calculating a P value for the real-time observed OPM data based on the real-time OPM prediction.

10. The method of claim 9, wherein the determining that the real-time observed OPM data is the statistical outlier for the real-time OPM prediction further comprises:

determining that the P value is less than a threshold.

11. The method of claim 8, wherein the prediction model is a time-series prediction machine-learning model.

12. The method of claim 11, wherein the time-series prediction machine-learning model is an autoregressive integrated moving average (ARIMA) model.

13. The method of claim 8, further comprising:

while the demand surge exists, determining a second surge modifier for a second sub-hour time interval, wherein the first sub-hour time interval and the second sub-hour time interval are within a single hour.

14. The method of claim 13, further comprising:

while the demand surge exists, uploading the second surge modifier to the dayparting system of the search engine to bypass the first surge modifier.

* * * * *